July 5, 1927.
M. W. SELLS
1,634,758
CORN HUSKING MACHINE
Filed Nov. 3, 1925
2 Sheets-Sheet 2
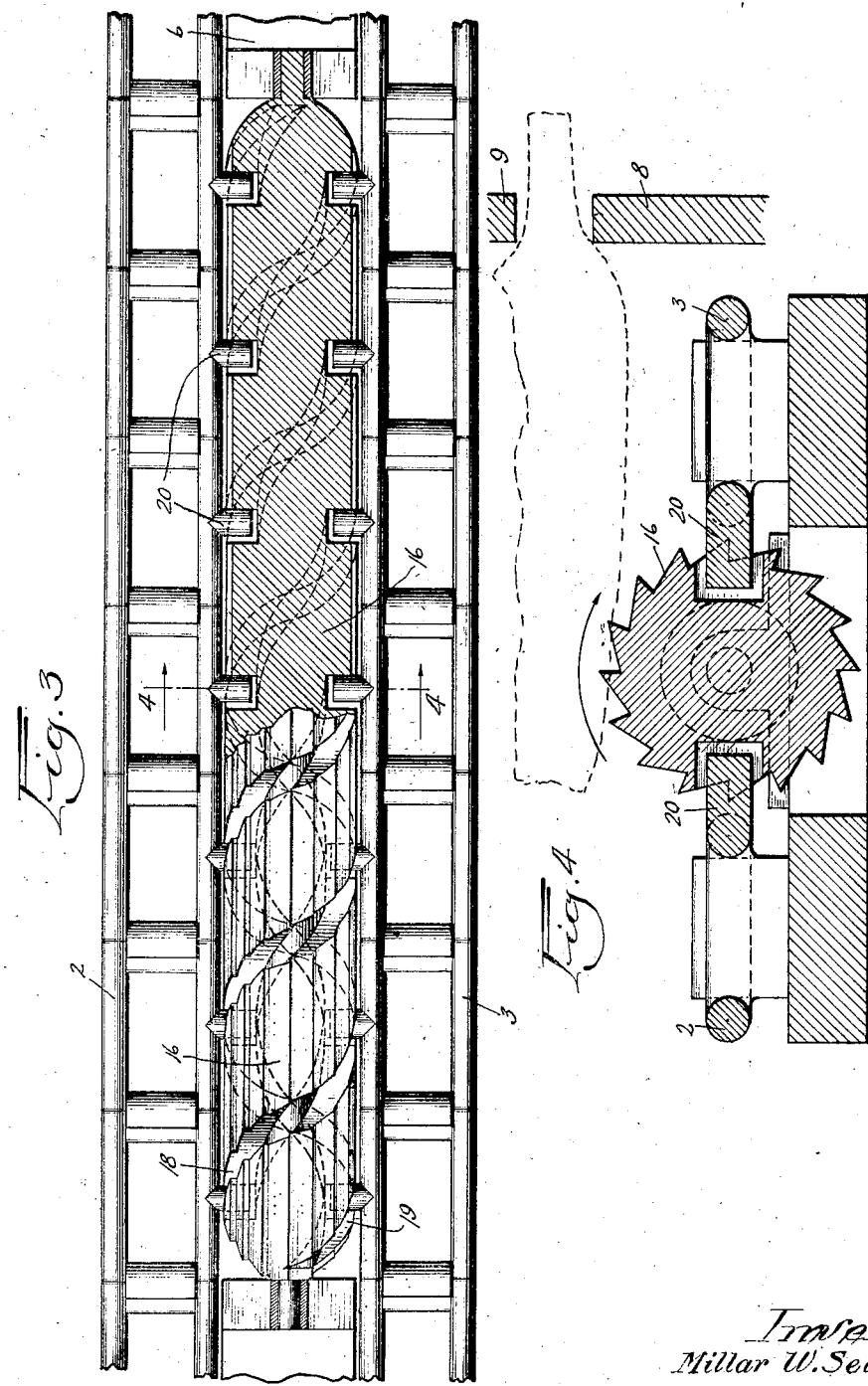
Inventor
Millar W. Sells Patented July 5, 1927.

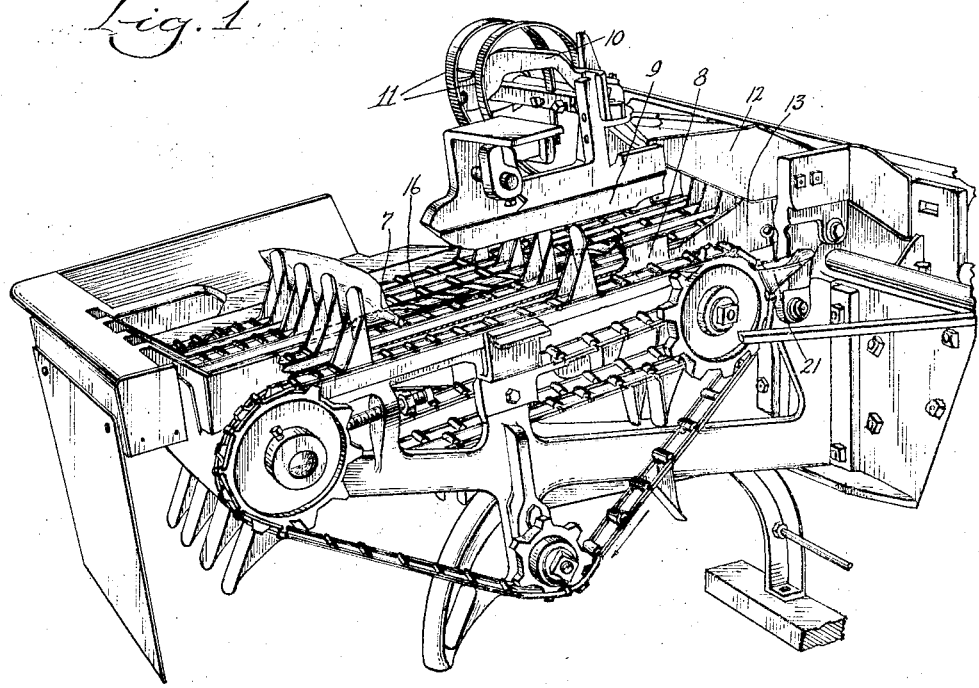

1,634,758

UNITED STATES PATENT OFFICE.

MILLAR W. SELLS, OF BUFFALO, NEW YORK, ASSIGNOR TO PEERLESS HUSKER COMPANY, OF BUFFALO, NEW YORK.

CORN-HUSKING MACHINE.

Application filed November 3, 1925. Serial No. 66,661.

This invention relates to an improved machine for husking green corn for canning purposes and contemplates subjecting the ears of corn in successive sequence to treating means located along their path of travel through the machine, whereby the husks are progressively removed from each ear as it is continuously advanced through the machine.

Corn for canning purposes is gathered from the field when it is green and tender and is dumped promiscuously into the husking sheds at the cannery and as it is conveyed to the various machines for treatment prior to canning the ear sizes are thoroughly mixed and no effort is made to assort them. Little and big; short and long follow each other in endless procession through the various machines constituting the preliminary operations.

Before the kernels can be cut from the cobs it is necessary that the husks and silks be removed from the ears. Various and sundry machines and mechanism have been employed for this purpose, all of which have heretofore been more or less complicated and some of which attempted to move the ears in different angular positions relative to their axes during the husking operations, involving the use of mechanism unnecessarily large and cumbersome and requiring the use of a large number of parts in order to retain control of the ears during their passage through the machines.

It is an object of this invention to provide a machine whereby the operations of removing the husks and associated parts are effected quickly and efficiently and with a minimum number of parts, and so organized that the ears of corn, from the time they are first placed in the machine until they issue therefrom, are always retained with their axes at the same angle, thereby avoiding the necessity of employing complicated mechanism for controlling the movement of the ears which would otherwise be necessary if the ears during their passage through the machine were shifted so they assumed different angular positions.

It is also an object of this invention to provide a machine for treating ears of corn in the husk for the removal of the husks therefrom whereby the ordinary run of ears will each receive the same aligning and positioning action irrespective of their length or diameter, and which will require no special adjustments for the handling of ears of the extremes in size.

It is a further object of my invention to provide an ear treating means that will handle effectively, ears of the utmost extremes in size by means of comparatively slow moving mechanism so as to eliminate undue wear and upkeep and that will permit of passing a greater tonnage per hour or per day without impairing in the least the efficiency of the machine and to do this without the necessity of extreme care on the part of the operator in placing the ears of corn in the machine.

Another object of the invention is to provide a corn husking device having continuous movement and cooperating with a continuously moving aligning device, which latter device derives its movement by contact and with interlocking engagement with the conveyor that carries the ears of corn into and through the machine.

It is also an object of the invention to provide a machine that will receive the individual ears on a continuously moving conveying mechanism whereon the ears are arranged in spaced relation with their axes approximately parallel but in irregular lateral alignment; to move them continuously along a path where they are intercepted by aligning means operated by the movement of the conveyor and which engages the ears and moves them axially against a gaging means, this axial movement occurring simultaneously with the regular forward movement of the ears imparted thereto by the said conveying mechanism; continuing the movement of said ears after gaging, past and through means for removing the husks from each ear in successive stages, and then discharging the husked ears from the machine.

With such objects in view as well as other advantages inherent in the invention, the novel structural peculiarities, novel organization of elements, and the separate and collective operations involved in carrying out the recited objects of my invention, which will be made the subject matter of claims hereto appended, I wish it to be understood that the several necessary elements and combinations constituting the same may be varied in their proportions, placement, general arrangement and operative relation without departing from the scope and nature of my invention.

In carrying out the objects of my invention in a concrete form or machine, further objects, advantages and improvements have been evolved than have been recited, and in order to make the invention more clearly understood there are shown in the accompanying drawings, means and mechanism embodying the preferred structural arrangement and the preferred disposition of the different parts and combinations, in which I have simply illustrated one way of embodying the creative part or conception of the invention in a concrete form or machine and in so doing I do not wish to limit the claims to the exact details of construction shown. The described devices are simply embodiments of the invention which other structures might also employ and some of the parts and combination of parts may be used without the others in different types of such machines without departure from the purview of my invention and I regard myself as entitled to such variations from the shown and described devices as fall within the scope and meaning of the claims hereto appended.

Reference being now had to the accompanying drawings a clearer and better understanding of the arrangement and operation of the machine will be had, wherein:

Fig. 1 is a perspective of a complete corn husking machine embodying my machine with parts of the gaging member broken away to better show the operation of the apparatus.

Fig. 2 is a plan of the machine of Fig. 1, but with some of the overhead mechanism removed to show clearly the relative locations of the various operative mechanisms and particularly the ear aligning and final husk removing devices.

Fig. 3 is an enlarged plan, partly in section of the ear aligning device, showing its operative relation with the main conveyor and the manner of driving it from the conveyor. This view shows this device in the same general position and location as in Fig. 2 but with more detail disclosed.

Fig. 4 is a cross sectional view on approximately the line 4—4 of Fig. 3, showing still more clearly the exact construction of this aligning device in operative relation with the conveyor chains.

It is to be understood that the drawings accompanying this application are more or less diagrammatic in character; are not necessarily drawn to scale, neither do they necessarily represent the best or the preferred engineering practices in connection with the construction of machines of this type or nature, also the proportions and relations of some of the parts may be more or less exagerated in size or shape to better illustrate the application of the invention to an operative machine.

I also wish to mention, before continuing with a detailed description of the machine and its operation that this invention contemplates treating and operating on ears of corn in the husk for the removal thereof, in successive and progressive stages, wherein the stalk ends of the ears are properly aligned while passing through the machine and are operated upon to remove this stalk end and a portion of the husks adhering to this stalk end which has the effect of releasing the husks on the ear so that the final removing means which will be fully described, will be able to completely remove all of the husks and silks adhering to the ears. The special lateral aligning means and the successive operations of husk removal cooperating and acting in a manner to produce a superior product that is cleanly freed of husks and silks and in which the tender kernels on the ears are practically unbruised or uninjured in any manner that would permit the milk to escape before they reach the cutting machines.

The operative mechanism of the machine of the drawings is carried on a suitable framework and comprises a set of continuously moving conveyors designated by the numerals 1, 2, 3 and 4. Ear supporting bars are placed between the series of chains as at 6. These bars form a support for the ears as they are moved forward by the conveyors. In the drawings I have shown four conveyor chains arranged side by side with the supporting bars therebetween, it is evident, however that any number may be provided to suit any operative conditions. The three conveyor chains 1, 2 and 3 constitute the main conveyor unit and are the chains that move the ears through the machine, the chain 4 serving a special purpose that will be referred to more specifically in the description of the operation of the machine.

All of the conveyor chains have flights arranged thereon to contact with and hold the ears in position as they are carried through the machine. Along the side of the machine of Fig. 1 where the stalk end of the ear is projecting designated by the numeral 7, is a gage plate or bar 8, mostly broken away for clarity. Arranged over this bar 8 and cooperating therewith is a companion bar 9. This bar 9 being held in operative position by means of gravity action through the medium of the pivoted arm 10 to which it is secured, the space formed by these two gage bars provides a channel through which the stalk end of the ear projects and moves, as, and after it is aligned laterally. 11 represents spring members lying over the bed and adapted to rest on the ears as they are moved thereunder and to assist in holding them in position for treatment. Just ahead of the gage bars 8 and 9 are arranged severing knives for cutting off the stalk ends of the ears and a portion of the husks adhering thereto, these knives may be of any type or shape suitable for the purpose. For my illustration I have shown simple fixed angular knives against which the ears are pressed and forced which results in the severance of this end of the husks, these knives are indicated at 12 and 13. As soon as the stalk end of the ear and a portion of the husks are removed the ears are discharged from the conveyors 1, 2 and 3 directly into the control of another conveyor 14 which engages the ears by the trimmed ends and moves them axially along the husk removing rolls 15, which latter are usually made of soft rubber. Here the ears are swiftly rotated by the rapidly revolving rolls 15 and the previously loosened husks are gripped between the surfaces of the soft rubber rolls and quickly removed from the ears together with the silk and the ears discharged from the machine practically cleaned and read for the machine that cuts the kernels from the cobs.

The principal improvement in this machine resides in the device for aligning the ear laterally against the gages 8 and 9. This device consists of a fluted roll located between the chains 2 and 3, designated by the numeral 16. The flutes 17 on this roll 16 run longitudinally of the roll and are shown as of saw shape, although other shapes may be used if desired. The fluted surface of this aligining roll is raised somewhat above the bed of the machine on which the ears rest and move through the machine, so that as each ear moves onto the fluted roll it is raised above the bed slightly and rests with almost its full weight on the flutes. This roll is given rotation in the direction of the arrow of Fig. 4 and the flutes engaging the husks of the ear move the ear laterally until the stalk end engages and rides against the gage bars 8 and 9 and the stalk projects through the space formed by the said bars as is indicated in Fig. 4.

Rotative movement is given the fluted aligning roll 16 through the medium of spiral grooves 18 and 19 as is clearly shown in Fig. 3. The chains 2 and 3 are provided at proper intervals with driving pins or lugs 20, some of which are always riding in the spiral grooves 18 and 19 and thereby lock the movement of the roll to the movement of the chains and thus give it positive motion without other mechanism.

*Operation.*

An operator or feeder stands at the front of the machine of Fig. 1 and either places the ears on the conveyors or sees that they are properly placed if the feeding is done by automatic means. The ears need not be placed accurately as to lateral alignment since the subject of this invention takes care of this alignment. One ear is placed in front of each set of flights on the several conveyor chains and is immediately moved forward and is caused to ride up onto the fluted surface of the aligning roll 16. This roll deriving movement as has been described engages the husk surface of the ears and the comparatively sharp edges of the flutes cut slightly into the husks, but not sufficient to reach the kernels and thus move each ear laterally until the stalk ends are in engagement with the aligning gages 8 and 9 after which during the continued period of their contact with the ear, it exerts a slight pressure on the ear in the direction of the gage bars mentioned and thus holds it in position until fully engaged by the spring members 11 riding over the tops of the ears and pressing thereon to hold them in the aligned position during the first operation of husk removal. During these several adjustments of the ear, the ear is being advanced continuously through the machine and after it is properly placed and held it is brought into engagement with the husk removing knives 12 and 13 which remove the adhering piece of stalk and the ends of the husks at the stalk end of the ear and thus loosen the husks for the final removal operation. Many of the ears of corn when pulled from the stalks in the field break off close up to the ear so that there is no adhering short section of stalk, but even then the husks at this end are so securely fastened to the end of the cob they need further loosening before the husks can be finally removed in a cleanly manner. The knives 12 and 13 being placed slightly inside the gage bars 8 and 9 will engage all such ears and cut off the husks at the stalk end of the ears whether there is a part of the stalk there or not.

During this first operation of husk removal the chain 4 plays a very important part in the operation. When the stalk end of the ear contacts with the severing knives there is a tendency for the ear to swing on the bed. Immediately the ear begins to swing the flight on the chain 4 engages the stalk outside of the knives 12 and 13 and stops the swinging tendency. The ear now being supported on opposite sides of the severing knives is held and moved squarely into the knives and the end removed with the least effort. After the husks are severed and loosened on the stalk end of the ears they are discharged from the conveyors onto the final husking rolls as shown in Fig. 2 where the husks are finally and completely removed. An additional function of the chain 4 is in positively removing the cut off portion of each ear and discharging it from the machine through the spout 21 and thus prevent the accumulation of short stalk ends from clogging the mechanism.

The final husking rolls 15 are usually made of some soft yielding material, such as rubber and are arranged to turn at a comparatively high speed in the direction of the arrows on the rolls in Fig. 2. The ears with the previously loosened husks are given quite a rapid rotation by their contact with the swiftly rotating rolls 15 and the loose ends of the husks are engaged between the rolls and rapidly removed from the ears and discharged below the rolls onto suitable conveyors for their removal or down into chutes for their conveyance from the machine.

These two stages of operation are necessary for the rapid and successful removal of the husks from green corn and the combination of elements I employ for the purpose has resulted in a very successful and efficient machine and in a machine that will permit the passage of a greater tonnage per day than has previously been practical or possible.

The improved aligning roll described in this application is an improvement on the roll described and illustrated in my co-pending application Serial No. 737,579 and filed Sept. 13, 1924. It gives somewhat greater capacity in operation on account of the improved construction and thereby produces a somewhat more efficient machine than that of the application referred to.

What I claim as new and desire to secure by Letters Patent is:

1. A machine for removing the husks from ears of corn in successive stages comprising a plurality of conveying means moving in parallel relation and spaced apart, fluted rotary means located between two of said conveying means and deriving rotary movement from contact with said conveying means, said rotary means adapted to engage each ear of corn in passing and move it laterally for alignment, gaging means against which said ears are moved into alignment, severing means located in the path of said aligned ears for removing a portion of the husks therefrom, other conveying means for receiving said ears and moving them in an axial direction with rotary means for effecting the final removal of the husks from said ears.

2. A machine for removing the husks from ears of corn in successive stages comprising a plurality of conveying means moving in parallel relation and spaced apart, a roller having a fluted periphery located between two of said conveying means and deriving rotary movement from contact with two of said conveying means, said rotary means and the fluted portion thereof engaging the husks of said ears and moving said ears laterally for alignment, gaging means located along the path of movement of said ears against which said roller moves said ears for alignment, severing means for removing a portion of the husks from said ears and other means for removing the additional husks from said ears.

3. A machine for removing husks from ears of corn by successive stages, comprising means for moving ears of corn continuously forward in spaced relation and processional arrangement with their axes approximately parallel, a roller located in the path of travel of said ears and lying with its axes in line with the path of travel of said ears, longitudinally disposed flutes on the periphery of said roller adapted to engage the husks of said ears and move said ears for alignment, aligning gages against which said ears are moved by said fluted roller, continuing the forward movement of said ears after alignment against said gages and delivering each ear in succession to other conveying means for continuing the movement of said ears at approximately right angles to their former path of travel and in reformed processional arrangement with their axes in longitudinal alignment with means along said paths of travel for removing the husks from said ears.

4. A machine for removing husks from ears of corn in successive stages, comprising a plurality of conveying means moving in parallel and spaced relation for moving ears of corn continuously forward in spaced relation and processional arrangement with their axes at approximately right angles to their path of travel, a roller located between two of said conveying means and with its axes in line with the path of travel of said ears, longitudinally disposed flutes on the periphery of said roller, means for imparting rotation to said roller whereby said flutes will engage the husks of said ears and move said ears axially, gaging means against which said ears are aligned by said roller, continuing the forward movement of said ears after alignment and delivering each ear in succession to other conveying means for moving said ears at approximately right angles to their former path of travel and in reformed processional arrangement with their axes in longitudinal alignment with means along said paths of travel for removing the husks from said ears.

5. A machine for removing the husks from ears of corn in successive stages comprising a series of endless continuously moving conveyors arranged in parallel and spaced relation, and adapted to engage each ear at spaced points along its length, means for aligning ears of corn laterally so that one end of all ears will assume substantially the same lateral position, means located between two of said conveyors for moving said ears into said lateral positions, means located between two of said series of conveyors for performing a preliminary husk loosening operation on said ears as they pass, means adjacent said path of travel of said ears for engaging and holding them in their aligned positions during said operation with other conveying and controlling means for receiving said ears after said preliminary operation and moving them along a path at approximately right angles to their former path of travel and in operative relation with means for removing the remaining husks from said ears.

6. A machine for removing the husks from ears of corn comprising a series of endless continuously moving conveyors arranged in parallel and spaced relation for moving a succession of ears of corn past husk removing devices, means along the path of travel of said conveyed ears for giving said ears a desired lateral alignment comprising a roller located between two of said series of conveyors and underneath the plane of the procession of moving ears and having a broken peripheral contour for contacting with the husks on said ears and tending to move them into a desired alignment, gage members along the path of travel against which said ears are moved and held in said lateral alignment with means along the path of travel of said ears for releasing and removing the husks therefrom.

7. A machine for removing the husks from ears of corn comprising a series of endless chain conveyors for moving ears of corn in succession into and through said machine, an ear aligning device along the path of travel of said ears comprising a roller located between two of said series of chain conveyors and deriving movement from contact with said two conveyors and having a peripheral contour of fluted or undulating formation whereby points or ridges thereof will engage the husks on said ears and move said ears into a lateral alignment, gage members against which said ears abut and are held during their travel with means along said path for removing the husks from said ears in successive stages.

8. A machine for removing the husks from ears of corn in successive stages comprising a series of conveying chains moving in co-operative relation with one of said series moving at approximately right angles to the others, a plurality of husk removing devices located adjacent said chains, gaging members located adjacent said chains, presser members located over said chains all cooperating to handle and control ears of corn while the same are operated upon by said husk removing devices, an aligning roller having a fluted periphery and positioned relative to said chains and said gaging members to engage ears of corn and move them into abutment with said gaging members and hold them thereagainst until they pass under the control of said presser members, said fluted roller having rotative movement derived from contact with two of said conveying chains, all of said devices cooperating in synchronized relation to effectively remove the husks from said ears.

9. In a machine for removing the husks from ears of corn in successive stages, an ear aligning device for aligning ears of corn for preliminary husk loosening and removal comprising a conveying system for moving and controlling ears in succession, gaging members for limiting and positioning said ears, presser members for holding ears after positioning and a roller located below the path of travel of said ears having flutes or ridges on its periphery for engaging the husks on said ears and thereby moving said ears against said gaging members, said roller also having spiral grooves around its periphery with lugs on said members of said conveying systems for engaging said spiral grooves and thereby imparting rotative movement to said roller, with other rollers located in the path of travel of said ears and with preliminary husk loosening devices all cooperating and coacting to effect the complete removal of the husks from said ears in successive steps.

10. An ear aligning device for corn husking machines comprising a roller located below the path of travel of ears of corn through said machine, said roller having a fluted or ridged peripheral contour, said ridges lying parallel with the axis of said roller, spiral grooves around said roller through the medium of which rotation is given said roller through suitable moving devices, said roller being adapted to engage ears of corn and move them laterally into a desired alignment, said ears during this aligning movement resting on top of said roller by gravity.

11. A machine for removing the husks from ears of corn in successive stages comprising a series of endless continuously moving conveyors arranged in parallel and spaced relation and adapted to engage each ear at spaced points along its length, means for aligning ears of corn laterally so that one end of all ears will assume substantially the same lateral position, means located adjacent said conveyors for moving said ears into said lateral positions, means located between two of said series of conveyors for performing a preliminary husk loosening operation on said ears as they pass, means adjacent said path of travel of said ears for holding them in their aligned positions during said operation with other conveying and controlling means for receiving said ears after said preliminary operation and moving them along a path at approximately right angles to their former path of travel and in operative relation with means for removing the remaining husks from said ears.

12. A machine for removing husks from ears of corn in successive stages comprising a series of conveying chains moving in cooperating relation with one of said series moving at approximately right angles to the others, a plurality of husk removing devices located adjacent said chains and comprising a husk loosening element located between a pair of said chains and a husk removing mechanism located below one of said series of chains, presser members located over some of said chains and gaging devices located between a pair of said series of chains, rotary means for aligning the ears of corn with said gages all cooperating to handle and control ears of corn while the husks are being removed therefrom.

13. A machine for removing husks from ears of corn in successive stages comprising a series of conveying chains moving in cooperating relation with one of said chains moving at approximately right angles to the others, a husk loosening device and a gaging device located between a pair of said series of chains and a husk removing device located underneath one of said series of chains, rotary means for giving lateral alignment to said ears of corn, presser members for assisting to hold the ears in alignment while the same are being operated upon by said husk loosening device with means for imparting synchronized movement to said operative elements.

In testimony whereof I affix my signature.

MILLAR W. SELLS.